(12) United States Patent
Simpson et al.

(10) Patent No.: US 7,726,930 B2
(45) Date of Patent: Jun. 1, 2010

(54) ADJUSTABLE HEIGHT JIB FOR A HOOK-LIFT HOIST

(75) Inventors: David Simpson, Windsor Heights, IA (US); Thomas Waldschmitt, Ankeny, IA (US)

(73) Assignee: Swaploader U.S.A., Ltd., Des Moines, IA (US)

( * ) Notice: Subject to any disclaimer, the term of this patent is extended or adjusted under 35 U.S.C. 154(b) by 507 days.

(21) Appl. No.: 11/129,838

(22) Filed: May 16, 2005

(65) Prior Publication Data

US 2006/0263184 A1  Nov. 23, 2006

(51) Int. Cl.
*B60P 1/00* (2006.01)
(52) U.S. Cl. .................. 414/491; 414/543; 414/546; 414/549; 414/563; 414/498
(58) Field of Classification Search ............ 414/491, 414/563, 543, 546, 549, 498
See application file for complete search history.

(56) References Cited

U.S. PATENT DOCUMENTS

| 3,874,537 | A | 4/1975 | Kou |
| 3,892,323 | A | 7/1975 | Corompt |
| 3,964,625 | A | 6/1976 | Wirz |
| 4,053,074 | A | 10/1977 | Lemaire |
| 4,175,904 | A | 11/1979 | Airaksinen |
| 4,204,793 | A | 5/1980 | Lemaire |
| 4,265,463 | A | 5/1981 | Perruso |
| 4,350,469 | A | 9/1982 | Corompt |
| 4,470,747 | A | 9/1984 | Tichenor |
| 4,993,911 | A * | 2/1991 | Grant .................. 414/563 |
| 5,110,251 | A | 5/1992 | Gray |
| 5,601,393 | A | 2/1997 | Waldschmitt |
| 5,931,321 | A * | 8/1999 | Grant .................. 212/233 |
| 5,984,614 | A * | 11/1999 | Weber .................. 414/498 |
| 6,158,947 | A * | 12/2000 | Goiran et al. ............ 414/500 |
| 6,406,247 | B1 * | 6/2002 | Ghiretti et al. ........... 414/498 |
| 2005/0111948 | A1 * | 5/2005 | Nolasco et al. ........... 414/563 |

* cited by examiner

*Primary Examiner*—Michael S Lowe
(74) *Attorney, Agent, or Firm*—Kent A. Herink; Emily E. Harris

(57) ABSTRACT

An adjustable height jib is disclosed for an arm of a hook-lift hoist for loading of equipment, containers or the like onto a truck for transport. The jib has an elongate body with a hook located on each of its opposing end portions. The jib is mounted on the arm for pivotal movement between a first position for loading containers of a first height and a second position for loading containers of a second height. A lock secures the jib in either position. A feature of the adjustable height jib is that, upon release of the lock, it will pivot between a longer position as the hook-lift hoist is operated toward the loading position and a shorter position as the hook lift hoist is operated toward the transport position.

7 Claims, 4 Drawing Sheets

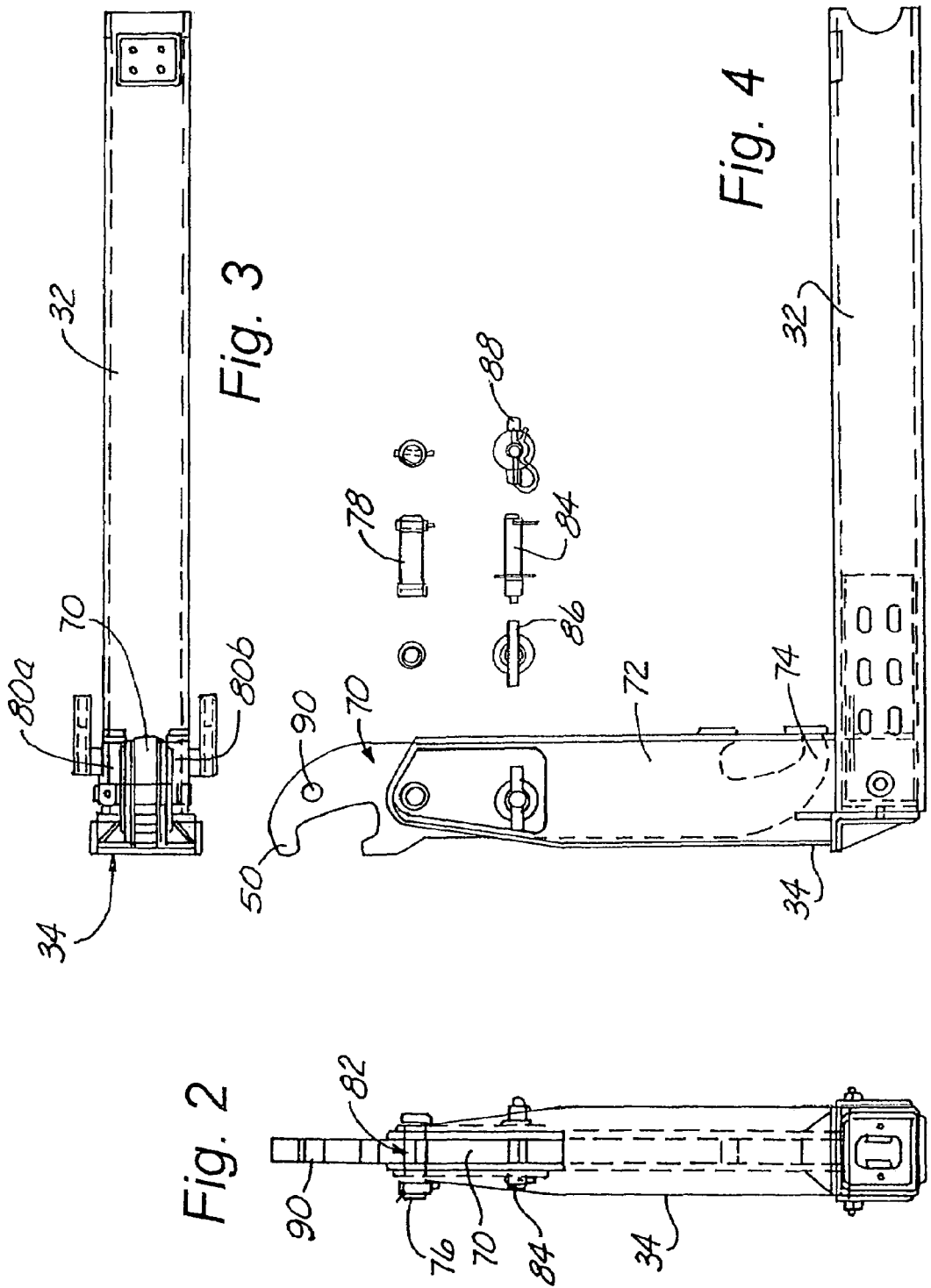

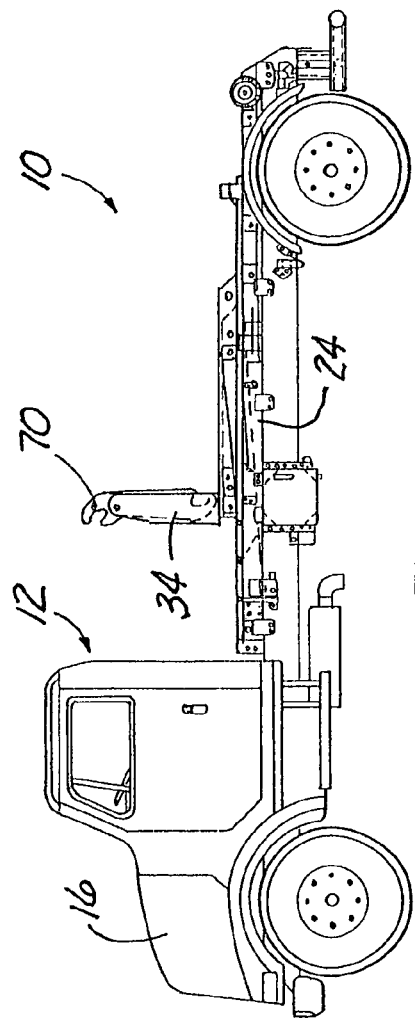
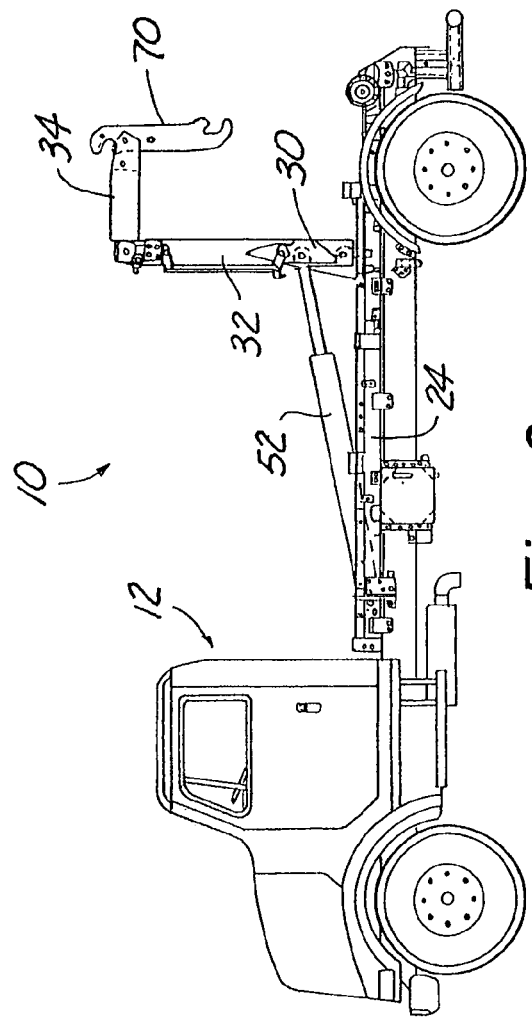

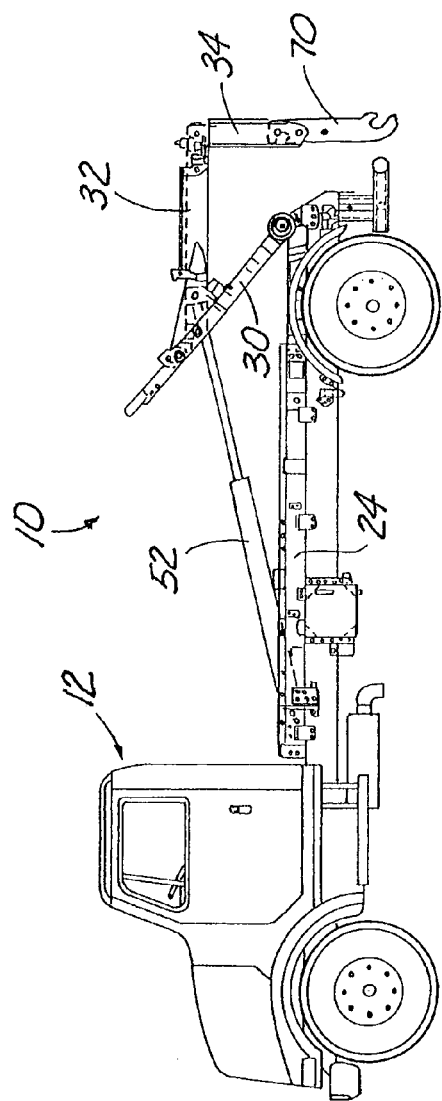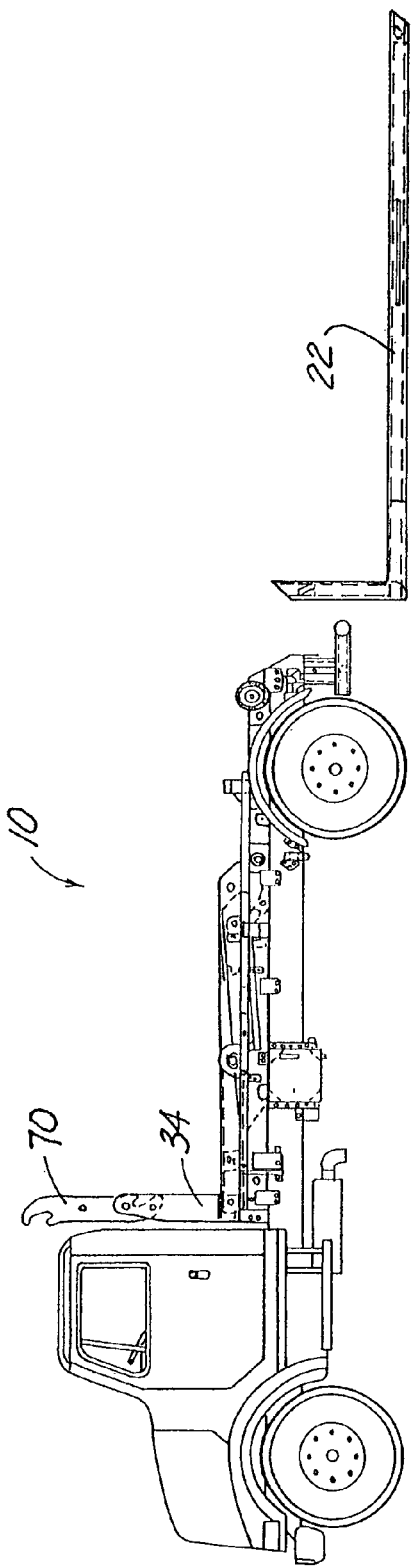

ADJUSTABLE HEIGHT JIB FOR A HOOK-LIFT HOIST

BACKGROUND OF THE INVENTION

The invention relates generally to hook-lift hoists mounted on a wheeled chassis and, more specifically, to a hook-lift hoist that has a jib that is adjustable in length to accommodate containers for loading and transport by the hoist of two different heights.

Hook-lift hoists have been in common use, particularly in European countries, for a number of years. The hoist has a pivotable L-shaped arm with a hook on its distal end portion or jib that is used to engage a detachable truck box. The hook of the jib engages a loading bar of the container or truck box and the arm is pivoted to lift the container onto the chassis for transport of the container and its contents to any location.

The truck box containers are manufactured in a range of sizes, each having a characteristic size and rated weight capacity. In general, the larger the container, the larger its rated weight capacity and the higher from the ground its loading bar that is to be engaged by the hook on the jib of the hoist. In the past, hoists have generally been engineered to have a loading capacity matched to the maximum loaded weight of the container it can load and transport. Accordingly, the hook of a hoist had a preset height corresponding to the loading bar of the matching container.

It has become known also to provide the truck chassis with a lift mechanism for tilting of the box atop the chassis to dump the contents of the box rearwardly of the truck. Hook-lift hoists allow for a single truck chassis to be used with a wide variety of truck boxes, each of which has a distinct and advantageous use. A single truck chassis with a hook-lift hoist can be used, for example, to load, transport and dump open-topped waste receptacles to a disposal site; to load, transport, and unload shipping containers; to mount, use, and dismount road maintenance equipment, such as a salt spreader; to load, transport, and unload wheeled equipment; and so on. This functional versatility makes hook-lift hoists an economical vehicle for transport industries, particularly the street and highway maintenance departments of municipalities, states, and other governmental entities where budgetary constraints and the variety of tasks that must be performed make these multi-purpose vehicles an attractive choice.

Given the diversity of containers and other types of equipment that are to be loaded and transported on hook-lift hoists, it has become desirable to be able to load and transport containers and other equipment of more than one size onto a hook-lift hoist.

SUMMARY OF THE INVENTION

In accordance with the present invention, a hook-lift hoist is provided which has a jib accommodates the loading and transport of containers of two different sizes. The hoist includes a hook-lift arm that has a jib segment or member. The jib member terminates at its free end portion with a hook for releasably grasping containers and the like. In the preferred embodiment, the jib member pivots on the hook-lift arm between an extended and shortened position to engage for loading containers or the like having loading bars that are at different heights.

The jib member has a pair of hooks, one at each end portion. The jib is mounted on the distal end of the hook-lift arm about a pivot axis that is closer to one of the end portions than the other. Pivoting the jib about the pivot axis by 180 degrees pivots the jib end-for-end between a first position where a first of the hooks is in operating position and a second position where a second of the hooks is in operating position. Since the pivot axis is closer to one of the hooks than the other, the working length of the jib changes as the jib is pivoted between the two positions. A keeper or latch secures the jib in either selected position.

Accordingly, an object of the invention is to provide a hook-lift hoist that can load containers or other equipment of more than one height.

Another object of the invention is to provide a hook-lift hoist wherein the jib is of adjustable length to engage containers of the like of different heights.

A further object of the invention is to provide a hook-lift hoist wherein the jib pivots between two working lengths by gravity alone during operation of the hook-lift hoist without the need for powered or manual adjustment.

These and other objects of the invention will be understood by a person skilled in the art upon a review of the specification, the associated drawings, and the appended claims.

BRIEF DESCRIPTION OF THE DRAWINGS

FIG. 2 is an enlarged end view of an adjustable height jib of the present invention.

FIG. 3 is an enlarged top view of the adjustable height jib of FIG. 2.

FIG. 4 is an enlarged side view of the adjustable height jib of FIG. 2, and includes an exploded view of a pivot pin and lock pin of the adjustable height jib.

FIG. 5 is a side view of the hook-lift hoist of FIG. 1 showing retraction of the jib member.

FIG. 6 is a side view of the hook-lift hoist of FIG. 1 showing movement of the hook-lift arm to a loading position wherein the jib member has pivoted toward its second position.

FIG. 7 is a side view of a hook-lift hoist of FIG. 1 in its loading position for a container of a reduced height.

FIG. 8 is a side view of a hook-lift hoist of FIG. 1 with the jib pivoted to its first position and in its loading position for a container of an elevated height.

DETAILED DESCRIPTION OF THE PREFERRED EMBODIMENT

Figure 1:
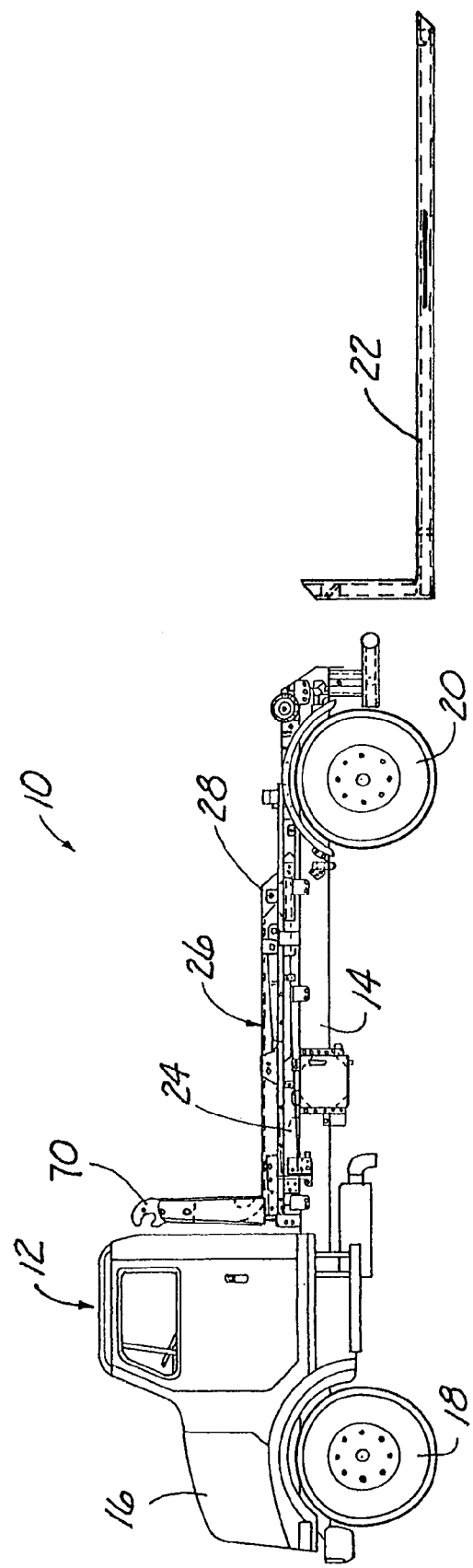
FIG. 1 is a side view of a hook-lift hoist of the present invention including an associated truck and illustrating a container for loading onto the hoist.

Illustrated in FIG. 1, generally at 10, is a dual capacity hook-lift hoist that is mounted a truck 12 having a chassis 14 and cab 16 supported on front wheels 18 and rear wheels 20. The hook-lift hoist 10 is used to load and unload objects on the truck 12 such as containers, equipment, and the like and, if desired, to tilt the loaded object for dumping of its contents. A platform 22 is shown in FIG. 1 as an example of an object to be loaded by the hook-lift hoist 10. A prior art hook-lift hoist 10 which may be altered to include the present invention is a Model SL-180 hoist sold by SwapLoader USA, Ltd., and as described in U.S. Pat. No. 5,601,393, which is incorporated herein by this reference.

The operation of a hook-lift hoist 10 is well known in the art and may be exemplified by the apparatus and operation described in the '393 patent. Generally, the hook-lift hoist 10 includes a mainframe 24 that is secured to the chassis 14 rearwardly of the cab (FIG. 1). An articulated hook-lift arm 26 is mounted to the mainframe 24 for pivotal movement about a horizontal axis, indicated at 28, transverse to the truck 12. The hook-lift arm 26 has three main components, an inner or base segment 30, a middle segment 32, and a jib member 34, as best illustrated in FIGS. 6 and 7. The inner segment 30 includes a frame that interconnects the inner segment 30 to the mainframe 24 for pivotal movement about the aforementioned horizontal transverse axis. In the prior art device, located at the free or distal end portion of the jib member 34, is a single hook 50.

The hook-lift arm 26 is pivoted by a pair of hydraulic cylinders 52 (FIGS. 6 and 7) that are supplied with pressurized hydraulic fluid by a hydraulic fluid supply system. At the initiation of the loading cycle, the hook-lift arm 26 is supported on the mainframe 24. A jib cylinder (not shown) is extended so that the jib member 34 is adjacent the cab 16 (FIG. 1). From this transport position, the jib member 34 is moved rearwardly by retraction of the jib cylinder, as illustrated in FIG. 5. The cylinders 52 are extended to pivot the middle segment 32 and the support jib member 34 relative to the inner segment 30 (FIG. 6). As the cylinders 52 extend further, the hook-lift arm 26 now pivots at the rearward or inner end portion of the inner member 30 about the axis 28 (FIG. 7). At full extension of the cylinders 52, the hook 50 is positioned below the mainframe 24 in a hooking position for engagement with a ground-supported object to be loaded on the truck 12, such as a platform 22.

Upon engagement of the platform 22 with the hook 50, the cylinders 52 are retracted to pivot the hook-lift arm 26 upwardly and forwardly, raising the forward end of the platform 22 off the ground and drawing the platform 22 closer to the truck 12. Continued retraction of the cylinders 52 raises the forward end portion of the platform 22 above the rearward end portion of the truck 12 whereupon the bottom of the platform 22 will be brought into contact with a pair of flanged rollers which serve to decrease the force required to drag the platform 22 onto the truck 12 and to keep it centered relative to the truck 12. Full retraction of the cylinders 52 brings the hook-lift arm 26 to the same, earlier described position of FIG. 5 where it and the platform 22 are supported on the mainframe 24. The jib cylinder 62 is then extended to move the platform 22 horizontally forwardly to a storage and transport position. It will be appreciated that the sequence just described is reversed to unload a platform 22 that has been previously loaded on the truck 12.

The improvement of the present invention is a modification to the jib member 34 by the addition of a pivoting jib 70, shown in expanded view in FIGS. 2-4. The pivoting jib 70 has an elongate body section 72 that terminates at each end portion with a hook, namely hook 50 and hook 74. The pivoting jib 70 is mounted for pivotal movement about pivot axis 76 relative to the jib member 34 by a pivot pin 78 that is mounted in the sidewalls 80a and 80b of the jib member 34 and passes through a pivot hole 82 in the pivoting jib 70. Accordingly, the pivoting jib 70 can move between a first position, as illustrated in FIGS. 1, 2, 4, and 5, to a second position, as illustrated in FIG. 7. The pivot hole 82 is located closer to the hook 50 than to the hook 74. Accordingly, movement of the pivoting jib 70 between the first position and the second position will effectively elongate the jib member 34 so that the hook 74 is positioned lower or closer to the ground than the hook 50 when in position to load an object (FIG. 7). The pivoting jib 70 is fixed in its desired position by a lock pin 84 (FIGS. 2 and 4) that includes a graspable handle 86 and a release pin 88. The lock pin 84 passes through a corresponding opening in the pivoting jib 70 to hold it in position when the lock pin 84 is in place but allow pivotal movement of the pivoting jib 70 when the lock pin 84 is removed. The release pin 88 prevents the lock pin 84 from being dislodged from its locking position unless the same is intended by an operator. A second position lock pin aperture 90 is provided in the pivoting jib 70 to hold the jib in its second position, as will be described in detail below.

In operation, for example when the pivoting jib 70 starts in its first position, as illustrated in FIG. 1, the jib cylinder is retracted to move the hook-lift arm 26 to the position of FIG. 5. The operator then removes the lock pin 84 and initiates movement of the hook-lift hoist 10 to pick up a container. As the hook-lift hoist apparatus 10 is moved, the hoist arm 26 begins to raise toward the position illustrated in FIG. 6. As the arm 26 tilts up, the pivoting jib 70 will pivot about the pivot axis 76 by the action of gravity, becoming vertical when the main orientation of the jib member 34 is horizontal (FIG. 6). Further movement of the hook-lift arm 26 will bring it to the loading position of FIG. 7 where the pivoting jib 70 is once more in parallel alignment with the jib member 34, although it has now moved to its second position wherein the second lock aperture 90 is now aligned with the lock pin position of the jib member 34. The operator will reinsert the lock pin 84 and release pin 88 to fix the pivoting jib 70 in its second position for picking up a container. In a similar manner, if the pivoting jib 70 is initially in its second position, operation of the hook-lift arm will result in pivotal movement of the pivoting jib 70 to the first position.

Alternatively, the jib member 34 may start with the jib 70 in the extended position, as illustrated in FIG. 8, although it is desired to load a platform of reduced height. The same procedure described above is followed to change the position of the pivoting jib 70 to accommodate the reduced height platform.

The loading bars of containers and other equipment to be loaded by the hook-lift hoist are at standardized, predetermined height intervals. Two common heights are 36 inches and 54 inches. Accordingly, in the preferred embodiment, the movement of the pivoting jib 70 from its first position to its second position will result in a change from a hook 50 height to accommodate a container having a loading bar height of 54 inches to the hook 74 having a height to accommodate a container having a loading bar height of 36 inches.

The foregoing description and drawings comprise illustrative embodiments of the present inventions. The foregoing embodiments and the methods described herein may vary based on the ability, experience, and preference of those skilled in the art. The foregoing description and drawings merely explain and illustrate the invention, and the invention is not limited thereto, except insofar as the claims are so limited. Those skilled in the art who have the disclosure before them will be able to make modifications and variations therein without departing from the scope of the invention.

We claim:

1. An adjustable height jib for an arm of a hook-lift hoist for loading of equipment, comprising:
   (a) a jib having a single rigid elongate body comprising a first hook at a first end portion of the jib and a second hook at the opposite end portion of the jib the first and second hooks being immobile relative each other such that only one of the first and second hooks is usable for loading at a time;
   (b) a pivot mounting the jib for pivotal movement about the arm between a first position wherein the first hook is in an operating position and a second position wherein the second hook is in an operating position; and
   (c) a lock operable for holding the jib in either the first or second position.

2. A jib as defined in claim 1, wherein the pivot is located nearer to the first hook than to the second hook.

3. A jib as defined in claim 1, wherein the jib is free to pivot about the pivot if the lock is released.

4. A jib as defined in claim 3, wherein upon release of the lock, movement of the arm toward a loading position will result in pivotal movement of the jib from its first or second position to its second or first position, respectively.

5. A jib as defined in claim 1, wherein the lock comprises a lock pin that is received into one of a pair of apertures, a first aperture for securing the jib in its first position and a second aperture for securing the jib in its second position.

6. An adjustable height jib for an arm of a hook-lift hoist for loading of equipment, comprising:
   (a) a jib having a single rigid elongate body comprising a first hook at a first end portion of the jib and a second hook at the opposite end portion of the jib the first and second hooks being immobile relative each other such that only one of the first and second hooks is usable for loading at a time;
   (b) a pivot mounting the jib for pivotal movement about the arm between a first position wherein the first hook is in an operating position and a second position wherein the second hook is in an operating position; and
   (c) a lock operable for holding the jib in either the first or second position.

7. An adjustable height jib for an arm of a hook-lift hoist for loading of equipment, comprising:
   (a) a jib having a single rigid elongate body comprising a first hook at a first end portion of the jib and a second hook at the opposite end portion of the jib the first and second hooks being immobile relative each other such that only one of the first and second hooks is usable for loading at a time;
   (b) a pivot positioned a fixed distance from the first hook and mounting the jib for pivotal movement about the arm between a first position wherein the first hook is in an operating position and a second position wherein the second hook is in an operating position; and
   (c) a lock operable for holding the jib in either the first or second position.

* * * * *